(12) United States Patent
Eisenmann et al.

(10) Patent No.: US 6,442,464 B2
(45) Date of Patent: Aug. 27, 2002

(54) PROCESS FOR THE CAPACITIVE OBJECT DETECTION IN THE CASE OF VEHICLES

(75) Inventors: Lutz Eisenmann, Vierkirchen; Yan Lu, Freising; Sivart Sauer; Christian Marschner, both of Munich, all of (DE)

(73) Assignee: Bayerische Moteren Werke Aktiengeselllschaft, Munich (DE)

( * ) Notice: Subject to any disclaimer, the term of this patent is extended or adjusted under 35 U.S.C. 154(b) by 0 days.

(21) Appl. No.: 09/796,670

(22) Filed: Mar. 2, 2001

(30) Foreign Application Priority Data

Mar. 3, 2000 (DE) .......................................... 100 10 531

(51) Int. Cl.⁷ .............................................. B60R 22/00
(52) U.S. Cl. ......................... 701/45; 180/268; 280/734; 280/735
(58) Field of Search ...................... 701/45, 47; 280/734, 280/735; 180/268, 271, 272

(56) References Cited

U.S. PATENT DOCUMENTS

| | | | | |
|---|---|---|---|---|
| 3,751,674 A | * | 8/1973 | Holt | 180/270 |
| 3,806,867 A | * | 4/1974 | Quantz | 340/457.1 |
| 3,864,668 A | * | 2/1975 | Bickford | 180/268 |
| 3,912,939 A | * | 10/1975 | Quantz et al. | |
| 3,993,940 A | * | 11/1976 | Volk, Jr. | 318/747 |
| 5,602,734 A | * | 2/1997 | Kithil | |
| 5,722,686 A | * | 3/1998 | Blackburn et al. | 280/735 |
| 5,802,479 A | * | 9/1998 | Kithil et al. | 701/45 |
| 5,872,232 A | * | 2/1999 | White | 280/735 |
| 5,948,031 A | * | 9/1999 | Jinno et al. | 701/45 |
| 6,014,602 A | * | 1/2000 | Kithil et al. | 701/45 |
| 6,094,610 A | * | 7/2000 | Steffens, Jr. et al. | 701/45 |
| 6,158,768 A | * | 12/2000 | Steffens, Jr. et al. | 280/735 |
| 6,253,133 B1 | * | 6/2001 | Sakai et al. | 701/45 |
| 6,283,504 B1 | * | 9/2001 | Stanley et al. | 280/735 |
| 6,292,727 B1 | * | 9/2001 | Norton | 701/45 |

\* cited by examiner

Primary Examiner—William A. Cuchlinski, Jr.
Assistant Examiner—Olga Hernandez
(74) Attorney, Agent, or Firm—Crowell & Moring LLP

(57) ABSTRACT

In a process for capacitive object detection in a vehicle seat, capacitors arranged in the backrest and in the seat surface are influenced by an object. The capacitors are acted upon by alternating voltage and their capacitance is determined individually. From the value of each of the two capacitances, an evaluation of the object is derived by means of a value table. When the two evaluations correspond to one another (concerning the type of an object), an occupant protection system assigned to the seat is correspondingly activated or deactivated.

7 Claims, 2 Drawing Sheets

PROCESS FOR THE CAPACITIVE OBJECT DETECTION IN THE CASE OF VEHICLES

BACKGROUND AND SUMMARY OF THE INVENTION

This application claims the priority of German patent document 100 10 531.9, filed Mar. 3, 2000, the disclosure of which is expressly incorporated by reference herein.

The invention relates to a process for object detection using capacitive elements.

Capacitive object detection processes are disclosed, for example, in International Patent Document WO 99/59003 A and German Patent Document DE 19612626 A. In principle, two capacitors (usually plate shaped) are arranged adjacent to the object that is to be detected. For detecting whether or not a vehicle seat is occupied, the capacitors are situated in the upholstery, for example in the seating surface and in the backrest. In this case, the detection is used for triggering safety devices, such as air bags or the like, only when the seat is, in fact, occupied.

When a person is present, the capacitance of the capacitors changes because of a human being's relatively good conducting capacity. To differentiate between a person and a child seat, the capacitance values must be observed and be evaluated by means of an algorithm.

It is an object of the present invention to provide a process of the initially mentioned type which, with low equipment expenditures, supplies precise information concerning not only the presence of an object but also about which object is involved.

This and other objects and advantages are achieved by the detection process according to the invention, in which capacitors arranged in the backrest and in the seat surface are influenced by an object. The capacitors are acted upon by alternating voltage, and their capacitance is determined individually.

In a first process according to the invention, two evaluations are derived by means of a value table and are compared with one another. If the two evaluations correspond with respect to the type of the object, the safety device is controlled as required (that is, triggered; or for example in the case of a rebound child seat or in the case of an unoccupied seat, not triggered).

In the second process according to the invention, the two evaluations are mathematically related to one another, and based on the value resulting from the mathematical relationship, a decision table is used to determine whether, as required, an occupant protection device assigned to the seat is activated. The mathematical relationship can preferably be an averaging or an adding of the two evaluations. Only an overall evaluation is used here.

According to the invention, at least one of the capacitances may consist of two partial capacitances which are formed by two capacitors arranged in the respective seat parts. This is a further refinement of the analysis.

Finally, in addition, the output signal of another seat occupation detection sensor can be taken into account at least when the two evaluations supply contradictory information with respect to the object.

Other objects, advantages and novel features of the present invention will become apparent from the following detailed description of the invention when considered in conjunction with the accompanying drawings.

DETAILED DESCRIPTION OF THE DRAWINGS

Figure 1:
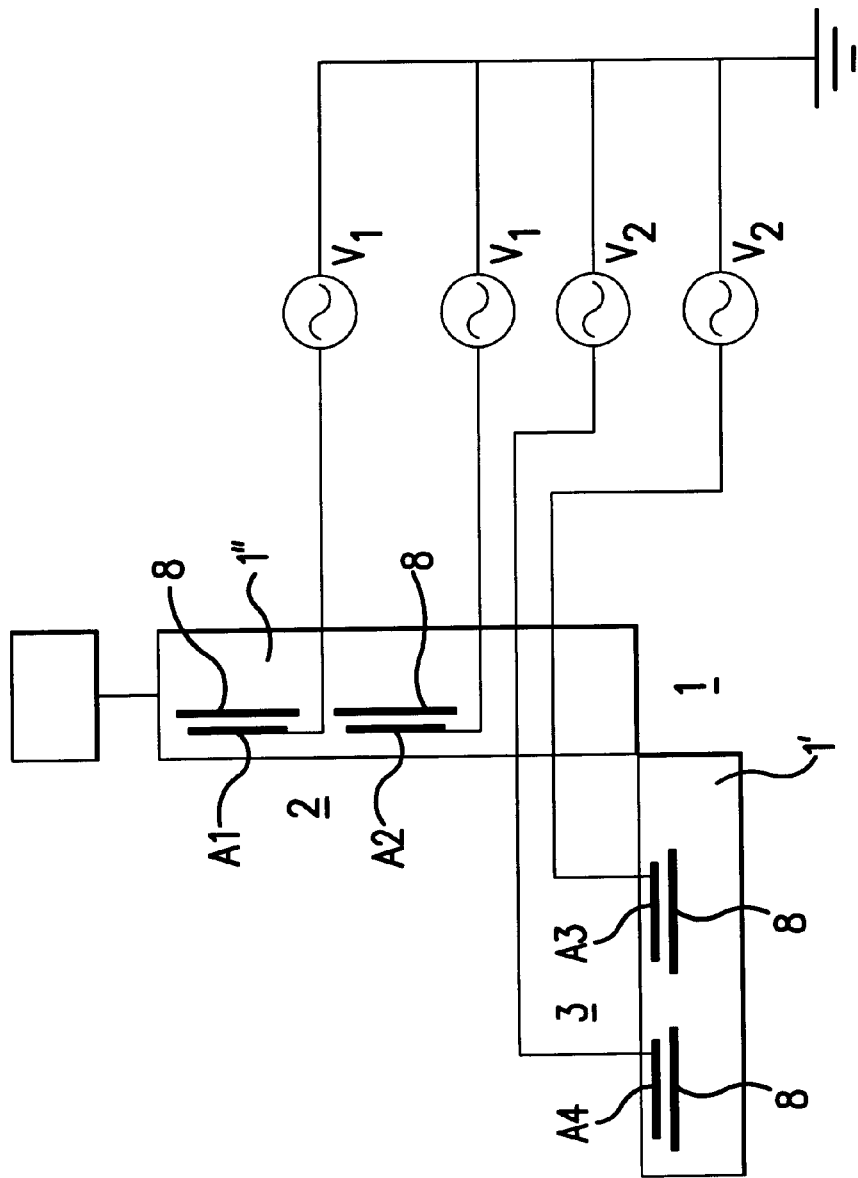
FIG. 1 is a schematic diagram of a system for implementing the process according to the invention.

FIG. 1 is a schematic representation of a switching arrangement according to an embodiment of the invention.

In a schematically illustrated vehicle seat 1, capacitors 3 and 2, situated in a seat surface 1' and a backrest 1", respectively, are each acted upon by alternating voltages $V_1$ and $V_2$. In practice, an alternating-voltage frequency between 10 and 150 kHz, preferably 50 kHz, was found to be expedient.

Each capacitor 2 and 3 consists of two partial capacitors A1 and A2 or A3 and A4. In addition, an electrically conductive plate 8 is assigned to shield each partial electrode, in order to achieve a directional effect toward the measured object.

The capacitance values ($C_{ext\_i}$, i=1, 2, 3, 4) of the four capacitors A1, A2, A3 and A4 are determined. From these values, the values $C_{vacant\_i}$ (i=1, 2, 3, 4) for the vacant seat are subtracted. (The latter were determined beforehand for the various types of seats.) From four differential values, the resulting $C_{obj\_i}$ are used and a classification takes place by means of them.

Every 500 ms, a new $C_{obj\_i}$ is determined. From these four values, also every 500 ms, a static algorithm is used to determine the actual rating, as to what is situated on the seat.

Generally, a high capacitance $C_{obj\_i}$ indicates that a person is situated in the seat; a low capacitance or no capacitance is typical of an unoccupied vehicle seat or of a vehicle seat occupied by an unoccupied child seat. In the case of a person of a normal sitting posture and normal clothing, high capacitances (approximately 40 pF) will occur at A2 and A3 and slightly lower capacitances (approximately 15 p to 25 p) will occur at A1 and A4.

In order to take into account various clothing variants and sitting postures, all 4 capacitors contribute to the rating, which is determined alternatively by one of two different methods.

In a first method, in each case, the capacitance values of the seat surface and backrest are added, and a rating is formed from the sum, separately for the seat surface and the backrest. If the two ratings correspond to one another in terms of to the type of the object (that is, for example, in both ratings, the object is found to be a person or an occupied rebound child seat on the front passenger seat) in the event that it is required, the safety device (for example, a frontal air bag) is activated or not activated. If the ratings reach contradictory results, the latter decision will be made as a function of the variation in time of the ratings.

For example, after the vehicle has been started or after an interruption of the operation during which the pertaining vehicle door was opened, if at first ratings exist which have the same tendency and which, during a defined time period (for example, 2 seconds) are definite and indicate the presence of a person, and if the two ratings subsequently contradict one another (typically, in the case of a person in the seat who then bends forward), the original information (person present) continues to be used even if the contradictory information lasts for a longer period, for example, 1 min.

In the second method, separate ratings are determined from the individual capacitance values, and an average value is formed from the four rating values. By means of a table, the average value is used to determine whether activation of the safety system is required.

Figure 2:
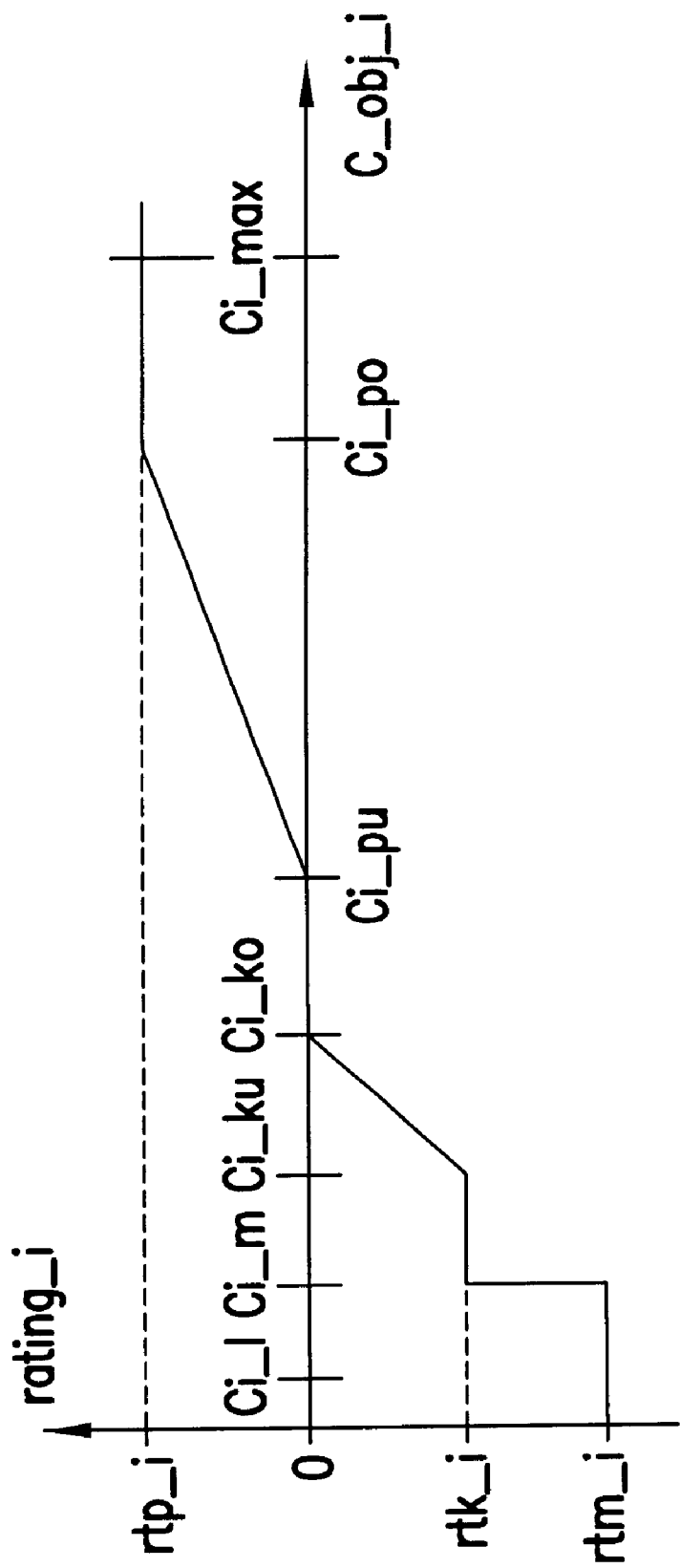
FIG. 2 is a diagram for explaining the process according to the invention.

Each rating takes place on the basis of a table whose values are graphically illustrated in FIG. 2. FIG. 2 shows the basic course of the rating_i on the basis of the capacitance value $C_{obj\_i}$ of the capacitor i (i=1, 2, 3, 4) or of the capacitance value present as a cumulative value of the capacitance of the capacitor 2 or 3.

Herein, rtp_i: rating_i when definitely a person rtk_i: rating_i when definitely a child seat rtm_i: rating_i a person absolutely improbable Ci_l: threshold vacant seat: if all $C_{obj\_i}$ <=Ci_l, then vacant seat Ci_m: minimum capacitance of person with an unfavorable sitting posture Ci_ku: child seat lower bend. Starting here, no longer 100% correlation to a child seat; the absolute value of the rating_i decreases, while its real value increases from a negative value (for example, −1), to zero.

Ci_ko: child seat upper bend. Starting here, no longer child seat; rating_i=0

Ci_pu: person lower bend. Starting here, a person; rating_i increases

Ci_po: person upper bend. Starting here, 100% correlation to a person

Ci_max: maximal capacitance: one or several C_obj_ i>Ci_max=>error

The assignment table is determined by measurement of the capacitance values $C_{obj\_i}$ using many different child seats and persons, with different clothing and in different seats.

The evaluation of the object is determined on the basis of the average value of the 4 individual capacitor ratings rating i. That is, rating=(rating_1+rating_2+rating_3+rating_4)/4. If:

rating<=0: Rebound child seat, safety system should possibly not be triggered rating>0: Person, safety system should possibly be triggered.

This results in reliable information concerning the type of object and the safety measure to be taken if required.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for object detection in a vehicle seat, using first and second capacitors arranged respectively in a backrest and in a seat surface of said vehicle seat, said capacitors having respective capacitances which are influenced by presence of an object, said process comprising:

energizing the capacitors with an alternating voltage;

determining capacitance value of each capacitor individually;

from the value of each of the first and second capacitances, determining respective first and second evaluations of the object by means of a value table; and when the respective first and second evaluations correspond to one another with respect to object type, correspondingly activating or deactivating an occupant protection system assigned to the seat.

2. A process for object detection in a vehicle seat, using first and second capacitors arranged respectively in a backrest and in a seat surface of said vehicle seat, said capacitors having respective capacitances which are influenced by presence of an object, said processing comprising:

energizing the capacitors with an alternating voltage;

determine capacitance of each capacitor individually;

from the determined capacitances, determining respective evaluations of the object by means of a value table;

relating the two evaluations to one another by averaging or adding to determine a resulting value; and based on the resulting value from the mathematical relationship, using a decision table to determine whether an occupant protection system assigned to the seat can be activated.

3. The process according to claim 2, wherein in said step of determining a resulting value, and average value of the two evaluations is obtained.

4. The process according to claim 1, wherein at least one of the capacitances comprises two partial capacitances which are formed by two capacitors arranged in the respective seat part.

5. The process according to claim 2, wherein at least one of the capacitances comprises two partial capacitances which are formed by two capacitors arranged in the respective seat part.

6. The process according to claim 1, wherein an output signal of another seat occupation detection sensor is taken into account at least when the two evaluations supply contradictory information concerning the object.

7. The process according to claim 2, wherein an output signal of another seat occupation detection sensor is taken into account at least when the two evaluations supply contradictory information concerning the object.

* * * * *